United States Patent [19]

Venkidu et al.

[11] Patent Number: 5,355,377
[45] Date of Patent: Oct. 11, 1994

[54] AUTO-SELECTABLE SELF-PARITY GENERATOR

[75] Inventors: Arockiyaswamy Venkidu, Milpitas; Larry Jones, Palo Alto; Nick Antonopoulos, San Jose, all of Calif.

[73] Assignees: Tetra Assoc. Inc., San Jose; OnSpec Electronic Inc., Santa Clara, both of Calif.

[21] Appl. No.: 156,075

[22] Filed: Nov. 23, 1993

[51] Int. Cl.$^5$ .................. G06F 11/10; H03M 13/00
[52] U.S. Cl. ................................................ 371/51.1
[58] Field of Search ........................ 371/51.1, 19, 49.1, 371/49.2, 49.3; 365/200; 364/266.3, 267.91

[56] References Cited

U.S. PATENT DOCUMENTS

| | | | |
|---|---|---|---|
| 3,404,372 | 10/1968 | Robbins | 371/49.3 |
| 4,049,956 | 9/1977 | Van Veen | 235/153 |
| 4,253,182 | 2/1981 | Porcella | 371/38 |
| 4,464,755 | 8/1984 | Stewart | 371/51 |
| 4,727,513 | 2/1988 | Clayton et al. | 365/52 |
| 4,850,892 | 7/1989 | Clayton et al. | 439/326 |
| 4,928,281 | 5/1990 | Kurosawa et al. | 371/51.1 |
| 4,942,575 | 7/1990 | Earnshaw et al. | 371/10.1 |
| 4,959,835 | 9/1990 | Yoshida et al. | 371/51.1 |
| 5,052,001 | 9/1991 | Jeppesen, III et al. | 371/49.3 |
| 5,088,092 | 2/1992 | Jeppsesn, III et al. | 371/49.3 |
| 5,107,507 | 4/1992 | Bland et al. | 371/49.1 |
| 5,228,132 | 7/1993 | Neal et al. | 395/425 |

Primary Examiner—Robert W. Beausoliel, Jr.
Assistant Examiner—Stephen C. Elmore
Attorney, Agent, or Firm—Stuart Auvinen

[57] ABSTRACT

A parity generating circuit that can replace the parity bit DRAM on a 9-bit SIMM. The parity generating circuit includes a parity generating tree which outputs the resulting even parity from the 8 data bits on a read. A 9th data input from another parity generator on the system mother board is compared to the generator tree output when DRAM is written to. If a mismatch occurs, the type of parity generated by the generator tree is opposite to the type of parity that the mother board generates, and the parity tree output must be inverted on subsequent reads. A latch is provided to store the compare result, which also indicates the type of parity required, even or odd, on the particular system the SIMM is installed on. The latch is loaded when the DRAM is written to. The state of the latch is used to output the correct type of parity on a read from DRAM by inverting the output of the parity generating circuit if needed. This eliminates the cost of the 9th DRAM chip on the SIMM, yet allows for parity checking of the data paths on the system board traces and any older 9-bit memory present in the system.

17 Claims, 5 Drawing Sheets

AUTO-SELECTABLE SELF-PARITY GENERATOR

BACKGROUND OF THE INVENTION

1. Field of the Invention

This invention relates to digital memory systems, and more particularly to parity generation and error detection for memory subsystems.

2. Description of the Related Art

Computers using memory such as Dynamic Random-Access Memory (DRAM) are well know in the art. Because of the very large size of such memories, even a very small error rate could cause serious operating failures. Error detection and even error correction methods have been employed to detect errors in DRAM memory and subsystems.

Personal computers, such as the IBM AT and compatibles, have included error detection in the form of parity. Parity is simply the "pairing" off of the data bits. If an even number of "1" bits is counted parity is true, while if an odd number of "1"s is counted parity is false. This is known as "Even" parity—an even number of "1"s produces a true or "1" output. A second type, "Odd" Parity, is true if an odd number of "1"s is counted. Since the two types of parity are mutually exclusive, an even parity generator will always output the opposite, or inverse logic value, that an odd parity generator would output when the same data word is input.

When 8 bits of data are written to the DRAM, parity is generated for the 8 bits and stored as a 9th bit in the DRAM array. Thus the DRAM is arranged as 9-bit data words; 8 bits of data and a 9th bit for storing the parity. Upon reading from the DRAM, the 8 data bits are input into a parity checker, which computes the parity and then compares it to the parity bit which was previously stored in the 9th bit location in the DRAM array.

When the parity checker finds that the parity bit does not match the previously stored parity bit, a parity error is detected. In the IBM AT computer, an interrupt is signaled and the computer halts operation. This prevents the error from being propagated, which could damage important system files.

Other small computer systems, such as those manufactured by Apple Computer, do not include error detection at all. Thus memory is organized in 8-bit words, which is less expensive than 9-bit words.

A second development in the Personal Computer industry has been the widespread acceptance of Single In-Line Memory Modules (SIMMs), such as is described in U.S. Pat. No. 4,656,605, issued Feb. 23, 1988 to James E. Clayton, hereby incorporated by reference. Clayton shows 8 memory chips mounted on a small epoxy-glass module board or substrate with a 9th memory chip also mounted for storing parity information. Other SIMMs with only 8 memory chips are also available, but these do not support parity checking. In addition, the terminal configuration and physical connectivity are different for 8-bit and 9-bit SIMMs, thus making the two incompatible.

A very large number of AT-compatible computers are now being built that accept 9-bit SIMMs. The high volume of SIMMs being manufactured has lowered the cost of memory, and higher-density memory subsystems can be designed using SIMMs, since the SIMMs are relatively small modules, having a length and width just adequate to mount the 8 or 9 DRAM chips possibly a few capacitors to suppress voltage transients or spikes, and the interconnection needed. These SIMMs are usually mounted at an angle to the mother board, allowing several SIMMs to be mounted in a small area of the mother board since the SIMM modules themselves stick up, out of the plane of the mother board. Often additional slots are included on the system mother board so the user can add additional SIMMs subsequent to manufacture and purchase of the PC.

A third development has been the increasing reliability of the DRAM chips themselves. DRAM errors are much less common than when the PC was first introduced. In fact, errors are so infrequent now that the need for error detection is questionable. At the same time, costs of Personal Computers have dropped dramatically, and profit margins have been squeezed by intense competition, making it desirable to eliminate the cost of the 9th data bit, especially since the value of parity checking is questionable.

However, simply using 8-bit-wide SIMMs is impractical, because of the physical incompatibility. In addition, the PC system may still perform parity checking unless parity checking is disabled, which requires modification of the system software. Modifying the system software, called the BIOS on an IBM AT or compatible, is undesirable because it can be difficult for the end user to change, usually requiring replacement of a ROM chip.

Some newer CPU chips have 9-bit data busses rather than the standard 8-bit busses. These CPUs perform parity checking themselves, rather than the memory controller subsystem on the mother board. This further complicates disabling of the parity checking.

If a system already contains 9-bit memory, and the user wishes to upgrade, using 8-bit memory would typically require disabling parity checking for all memory, including the older, less reliable 9-bit memory. Ideally, parity checking would still be performed on the older 9-bit memory, but not on the newer, more reliable 8-bit memory. In fact, checking for errors on the system board, or mother board, is still desirable, since physical connections such as solder and printed-circuit board traces may fail.

What is desired is an 8-bit SIMM that is physically compatible with 9-bit SIMMs, and yet still allows parity checking to occur on the motherboard and for other 9-bit SIMMs present.

SUMMARY OF THE INVENTION

The present invention is a parity generating circuit that can replace the parity bit DRAM on a 9-bit SIMM. This eliminates the cost of the 9th DRAM chip on the SIMM, yet allows for parity checking of the data paths on the system board traces and any older 9-bit memory present in the system. The parity generating circuit outputs the resulting parity from the 8 data bits on a read. A latch is provided to store the type of parity, even or odd, on the particular system the SIMM is installed on. The latch is loaded when the DRAM is written to. The state of the latch is used to output the correct type of parity on a read from DRAM, by inverting the output of the parity generating circuit if needed.

DETAILED DESCRIPTION

Figure 1:
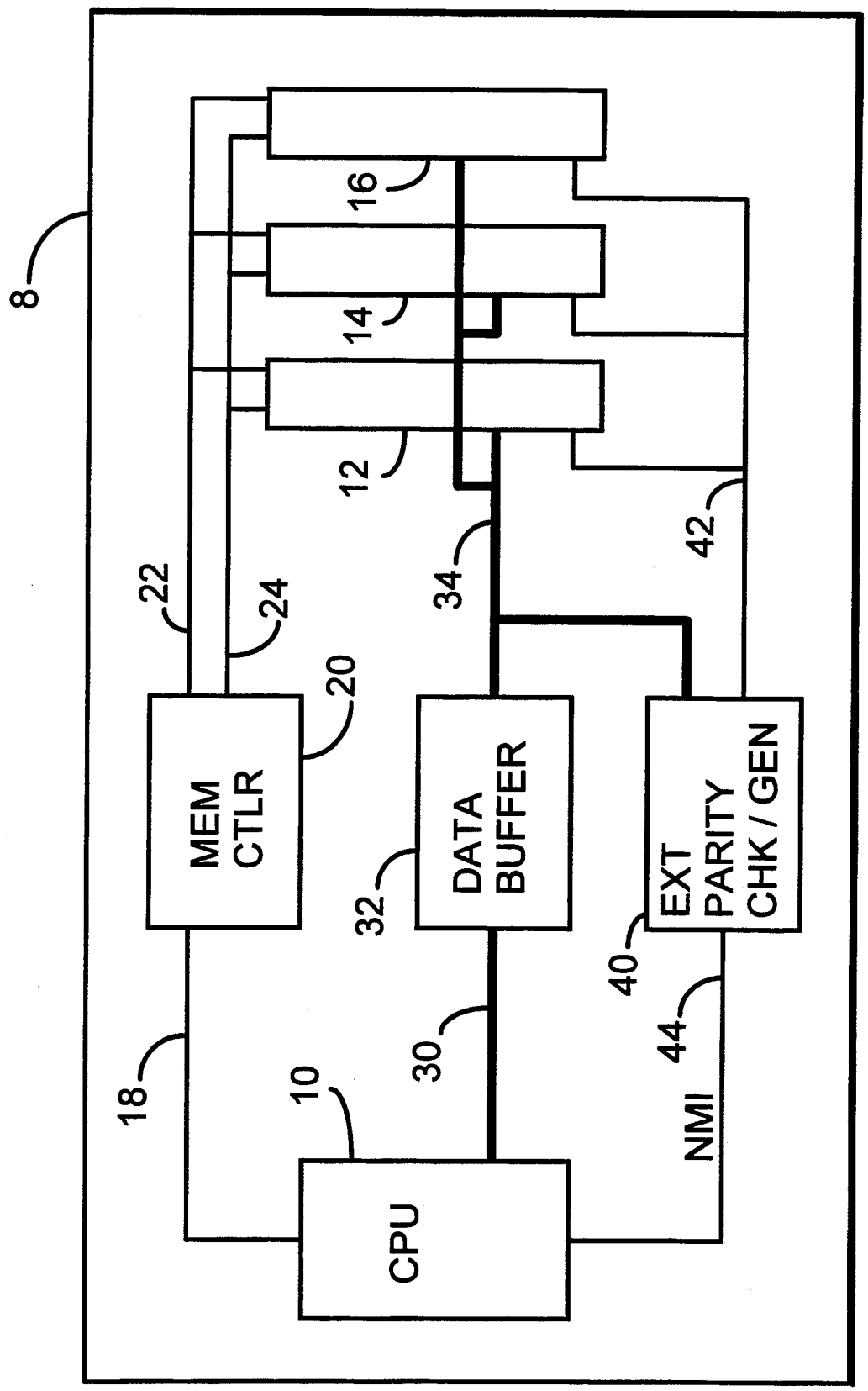
FIG. 1 is a block diagram of a simplified system with parity checking of DRAM.

FIG. 1 is a block diagram of a simplified PC system showing components located on system mother board 8. CPU 10 reads instructions from and transfers data to DRAM memory in SIMMs located in one or more of sockets 12, 14, 16. A system having only one SIMM socket populated with DRAM may be shipped to the user, who may later add additional DRAM by installing additional SIMMs. For example, a system may ship with a DRAM SIMM installed in socket 12, but with sockets 14 and 16 empty. The user may later plug in a second SIMM in socket 14 to increase memory size.

The CPU outputs an address on local address bus 18 to memory controller 20. Memory controller 20 decodes the address and activates control lines 22 to enable reading or writing to the DRAMs located in SIMM sockets 12, 14, or 16. Control lines 22 typically include row address strobe RAS, column address strobe CAS, and write-enable WE. Memory address lines 24 contain a multiplexed address for the DRAM inputs.

Data is transferred from CPU 10 to DRAM in SIMM sockets 12, 14, 16 along local data bus 30, through data buffer 32, and out onto memory data bus 34, which is connected to SIMM sockets 12, 14, 16. In the simplified system shown, the data path is 8 bits wide. When CPU 10 is writing data to DRAM, parity generator/checker 40 receives the 8 data bits from data bus 34, calculates the correct parity bit, and outputs this bit on line 42, for writing to the DRAM in SIMM sockets 12, 14, 16.

On a read operation, data is output from DRAM. The 8 data bits on bus 34 are again input to parity generator/checker 40, which again calculates the correct parity bit, but this time parity generator/checker 40 compares the generated parity bit to the parity bit that is outputted on line 42 from the DRAM. Line 42 is driven by one of the SIMMs in sockets 12, 14, 16, and more particularly by the 9th DRAM bit position of the SIMM being accessed. This parity bit was previously stored during a write to DRAM.

If the parity generator/checker 40 detects a mismatch between the currently generated parity and the parity bit outputted from DRAM on line 42, then a parity error has occurred and an interrupt is signaled to CPU 10 along interrupt line 44. This is a non-maskable interrupt (NMI) on IBM-AT compatibles.

SIMM sockets 12, 14, and 16 may be populated with standard 9-bit-wide SIMMs, such as described in Clayton, U.S. Pat. No. 4,656,605. These SIMMs contain 9 DRAM chips. Alternately, one or more of these sockets may be populated with the SIMM of FIG. 2, which replaces the 9th DRAM chip with the self parity generator of the present invention. However, the terminal connections of the SIMM of the present invention is the same as the terminal connections of the standard 9-bit SIMM, providing access to the DRAM chips.

Figure 2:
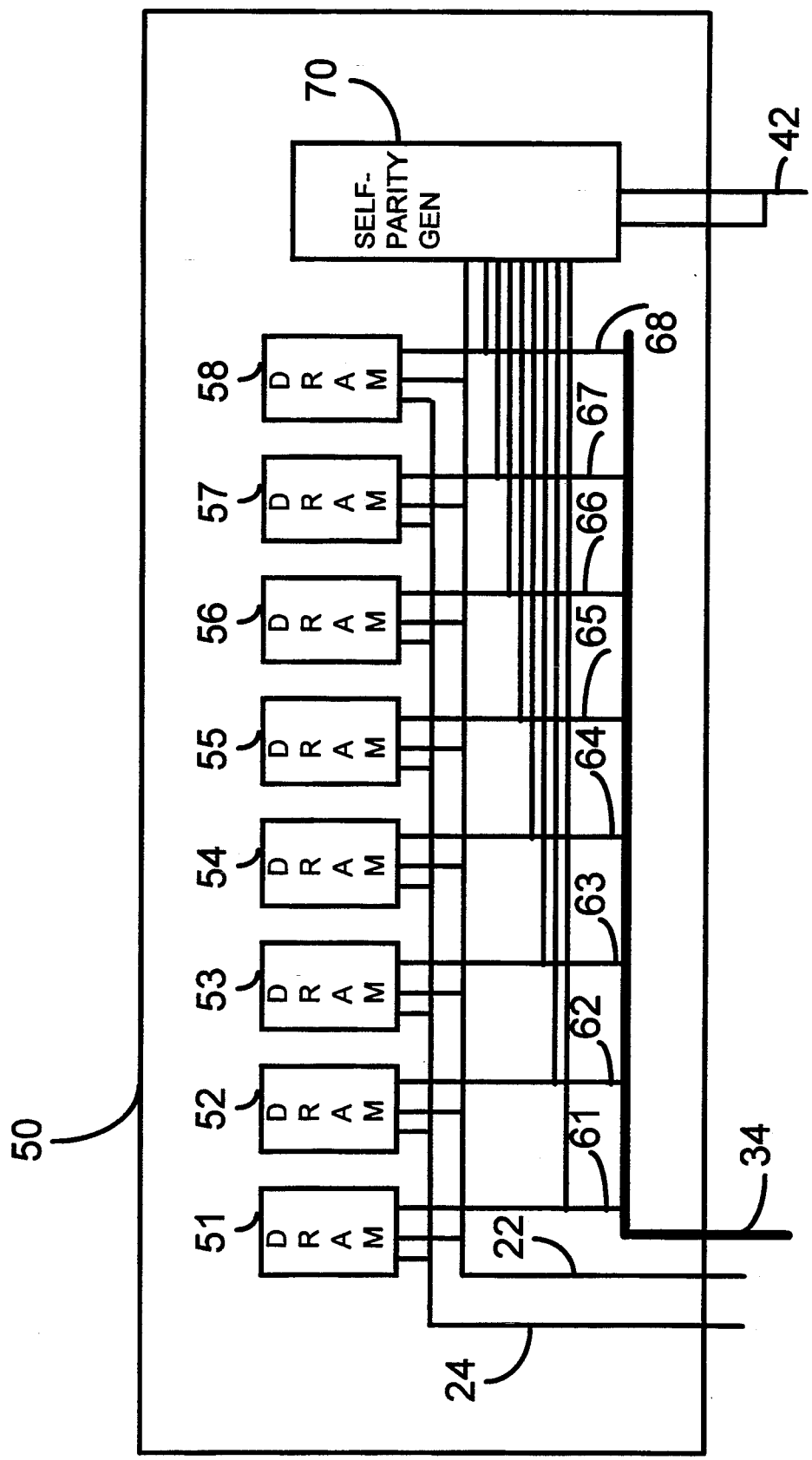
FIG. 2 is a 9-bit SIMM using the present invention in lieu of the 9th DRAM bit.

FIG. 2 shows SIMM module 50, which contains 8 DRAM chips 51–58. Control lines 22 contain RAS, CAS and WE and connect to all 8 DRAM chips 51–58. Memory address 24 likewise connects to all 8 DRAM chips. Memory Data Bus 34 splits into signals 61–68 which connect with the respective DRAM chips 51–58. This description up to this point is similar to that for an 8-bit SIMM.

Self-Parity Generator 70 is also located on SIMM 50 and connects to control lines 22, and all 8 of the data bit lines 61–68 of bus 34. Self-Parity Generator 70 also connects to parity signal 42. Self-Parity Generator 70 thus replaces the 9th DRAM chip of a 9-bit SIMM, although Self-Parity Generator 70 does not need to connect to memory address bus 24.

Figure 3:
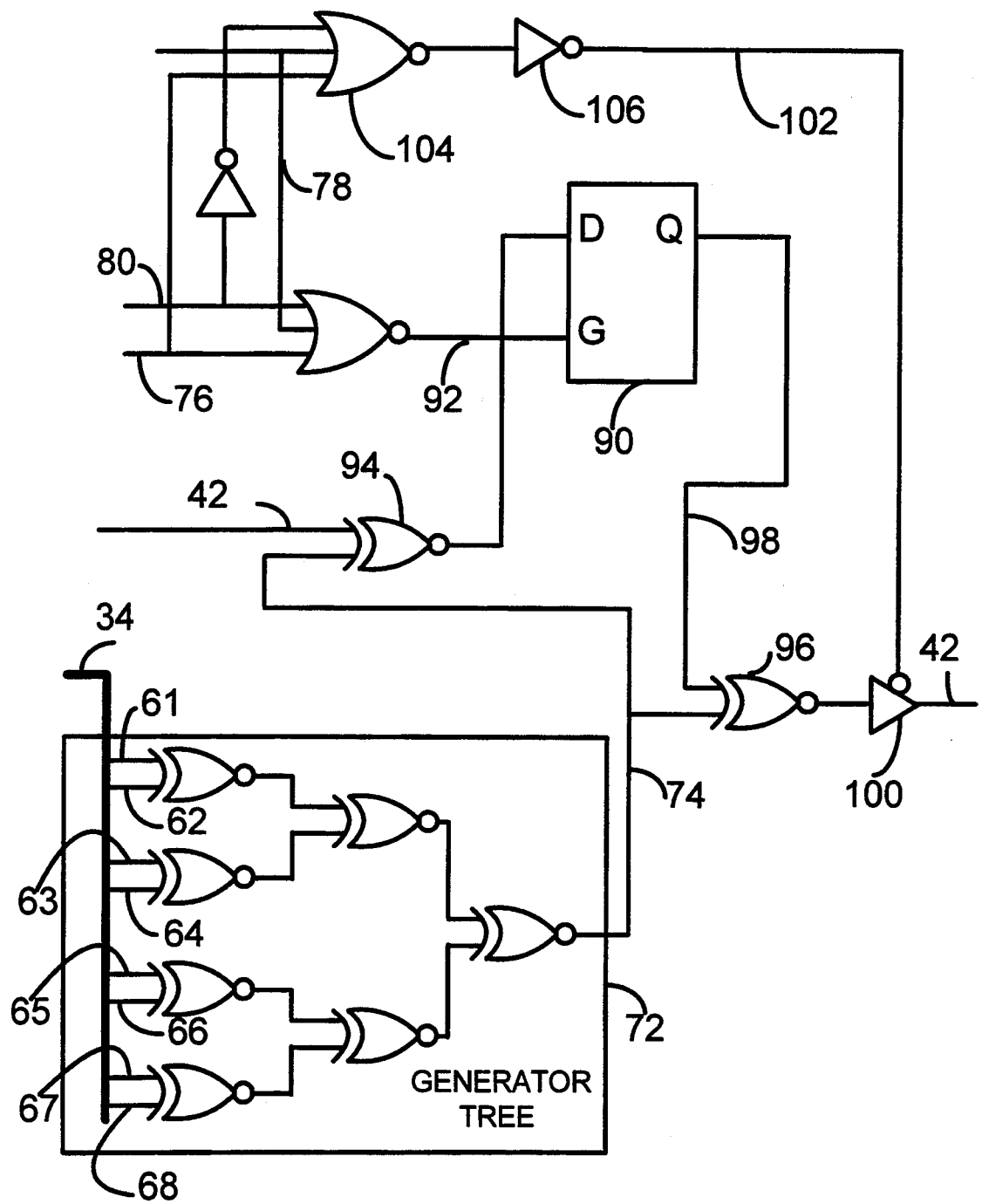
FIG. 3 is a detailed schematic diagram of the present invention.

FIG. 3 is a detailed schematic of the Self-Parity Generator 70 of FIG. 2. Signals 61–68 from memory data bus 34 are inputted to Parity Generator Tree 72, composed of a simple tree of exclusive-nor (XNOR) gates. These gates output a "1" if the 2 inputs match and a "0" if the inputs do not match. Thus output line 74 of the generator tree 72 will be a "1" if an even number of inputs 61–68 are otherwise a "0" will be outputted on line 74.

Parity Type Latch 90 will be loaded by gate input 92 when control signals RAS 76, CAS 78, and WE 80 are all active, which for these signals is a low logic value. The data stored in the latch is generated from XNOR gate 94. XNOR gate 94 has one input which is the output 74 of the generator tree 72, and the other input from output 42 of the parity generator/checker 40 on the system mother board 8. Thus the D-input to Parity Type Latch 90 is "1" when Even parity is detected by the Parity Generator Tree 72 and a "1" is generated by the parity generator/checker 40 on the mother board. If Odd parity is detected by the Parity Generator Tree 72 and a "0" is input on line 42 from the parity generator/checker 40, then the latch 90 is also loaded with a "1". When the Parity detected by the Parity Generator Tree 72 and the parity generator/checker 40 differ, then a "0" is loaded into latch 90. Thus latch 90 indicates whether the parity generated on the system board by the parity generator/checker 40 matches the parity generated by the Parity Generator Tree 72 on Self-Parity Generator 70. Since Parity Generator Tree 72 outputs Even parity, a "1" in latch 90 indicates that the system mother board uses Even parity, while a "0" in latch 90 indicates that Odd parity is used on the system mother board. Thus Parity Type Latch 90 indicates the type of Parity generated on the system mother board 8 by parity generator/checker 40 during the last DRAM write. Since the type of Parity is not changed dynamically, the value in latch 90 will also indicate the type of parity needed for the next DRAM read operation.

During a read from DRAM, the data read from the DRAM chips 51–58 of FIG. 2 will be outputted on data bit lines 61–68 and inputted to Parity Generator Tree 72. The resulting Even parity will be outputted on line 74 to XNOR gate 96. XNOR gate 96 is controlled by latch 90 via output line 98.

If latch 90 contains a "1", then XNOR gate 96 passes Parity Generator Tree output 74 without inversion. Thus Even parity is outputted. However, if latch 90 contains a "0", then XNOR gate 96 inverts signal 74, generating the opposite type of parity, or Odd parity.

Bus Driver 100 is a tristate driver to line. During a DRAM read cycle, RAS 76 and CAS 78 are active (low) while WE 80 is inactive (high), thus activating tristate enable line 102 via gates 104, 106. The output is connected to line 42, the parity bit line.

The preferred embodiment uses exclusive-NOR (XNOR) gates, which may be constructed from an exclusive-OR gate whose output is then inverted. Other well-known methods may be used to construct exclusive-OR and XNOR gates.

ALTERNATE EMBODIMENTS

Several other embodiments are contemplated by the inventors. For example, wider DRAM chips may be substituted; DRAM chips 51, 52, 53, and 54 may be replaced by a single 4-bit wide DRAM chip, and DRAM chips 55–58 could likewise be replaced with a 4-bit-wide DRAM chip. This could reduce the cost and/or size of the SIMM.

Figure 4:
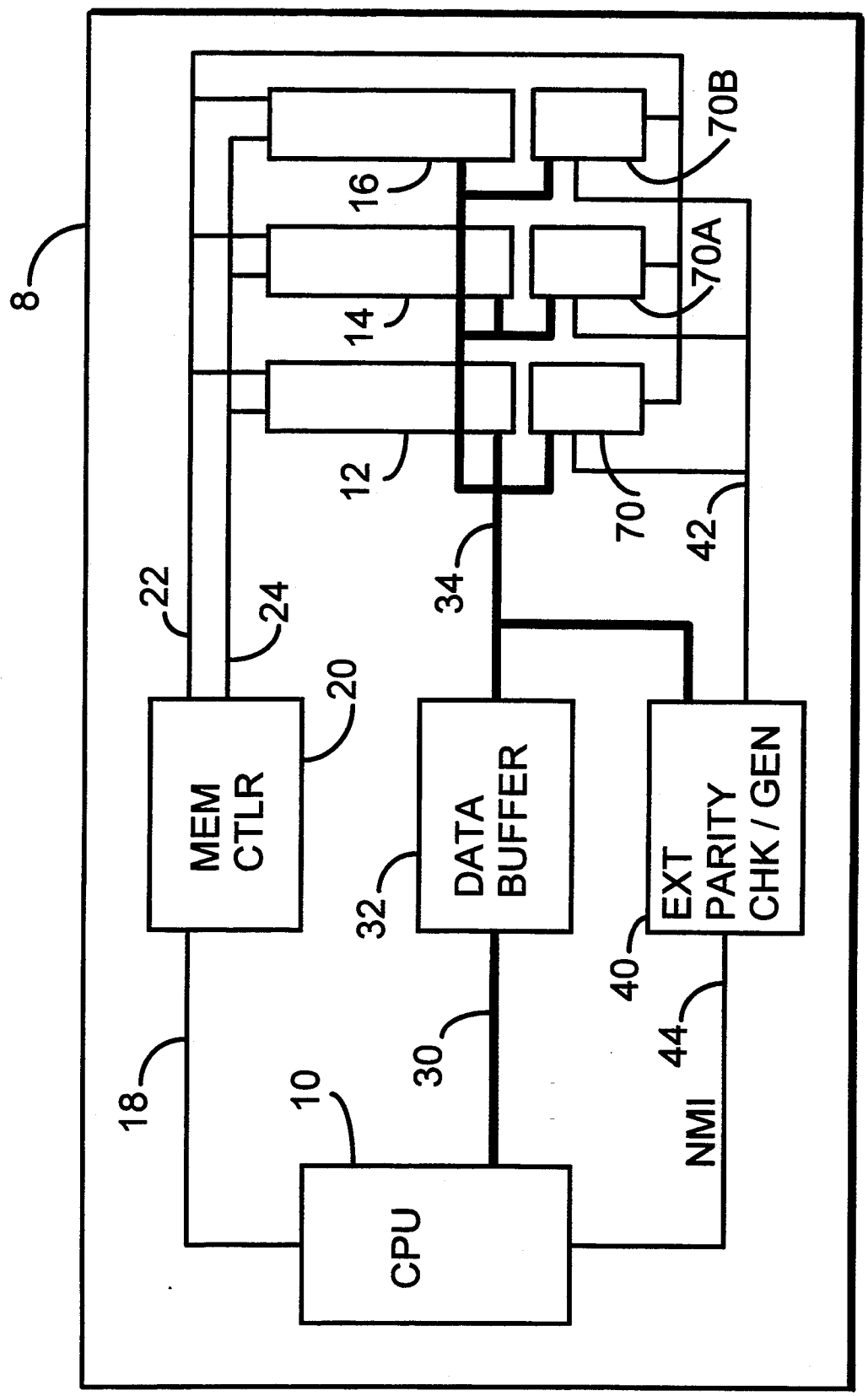
FIG. 4 is a motherboard employing the present invention in lieu of the 9th DRAM bit.

Another embodiment is to mount the Self-Parity Generator 70, 70A, 70B directly on the system mother board 8, as shown in FIG. 4. One Self-Parity Generator could be used for all banks of DRAM, or several Self-Parity Generators could be installed, one for each bank, thus allowing for error detection of mother board traces and component connections.

Data buffers may be present on the system board. These buffers may be of the inverting type, thereby switching the apparent parity type. The parity signal itself may also be inverted before being stored in a standard 9-bit memory SIMM.

The parity type latch is needed if the present invention is to be used with many systems of differing parity types. The latch will store the parity type seen at the DRAM during any or all write cycles. Thus, the present invention with the parity type latch will function properly on any system, regardless of the parity type or the presence of inverting data buffers.

Figure 5:
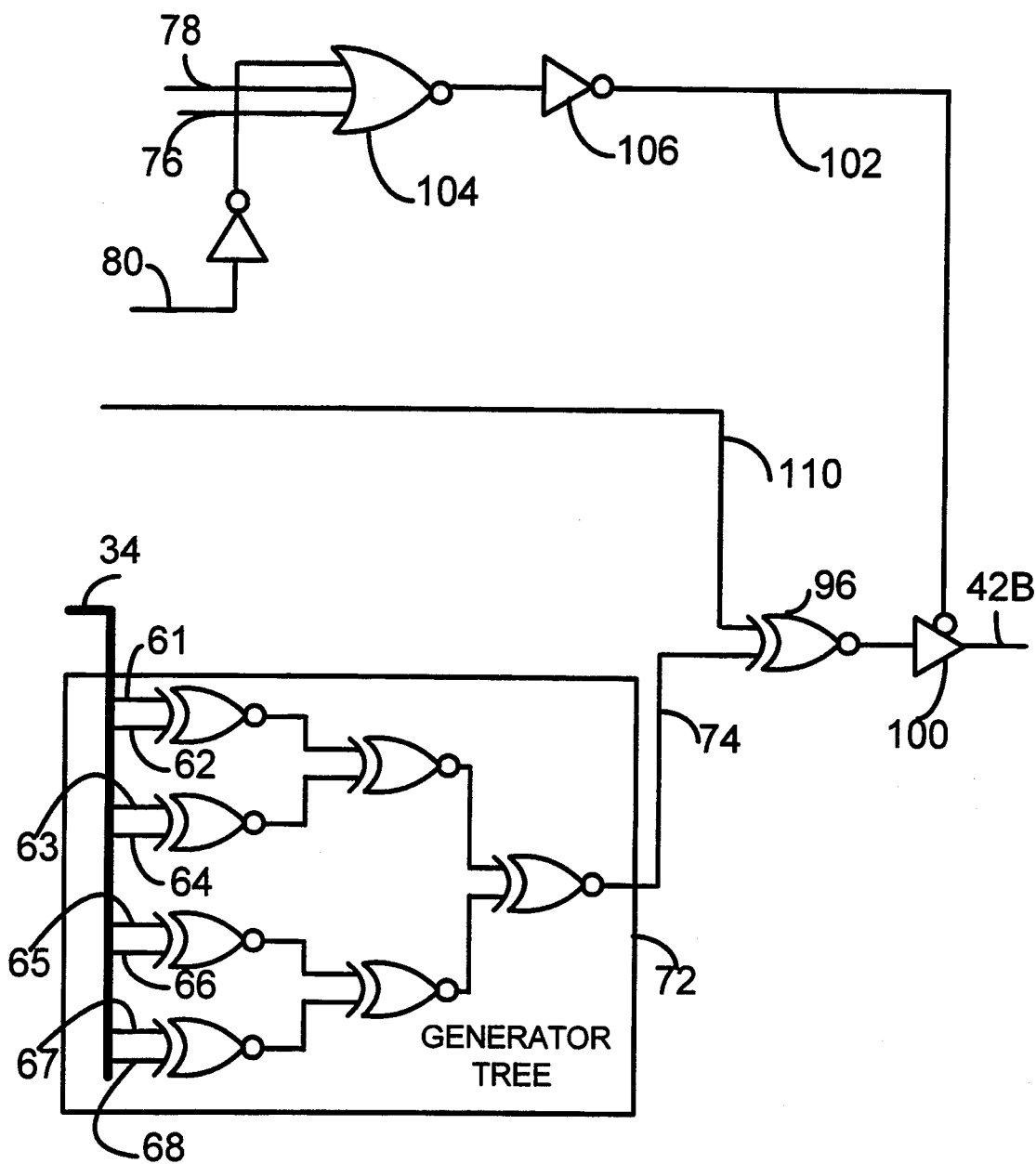
FIG. 5 is an alternate embodiment of the present invention.

The present invention may be modified for inclusion in a specific system, when the parity type is known. FIG. 5 shows that in this case the parity input from the parity generator/checker 40 on the system mother board 8 is not needed. In addition, Parity Type Latch 90 of FIG. 3 is not needed since the parity type is known. Instead a high or low signal is inputted to gate 96 on line 110. A high signal indicates that even parity is desired, and gate 96 does not invert the output 74 of Parity Generator Tree 72, which produces even parity. On the other hand, if Odd parity is needed, a low signal is inputted on line 110, causing gate 96 to invert signal 74, causing even parity to be outputted.

Although a simplified 8-bit system has been described, currently most PC systems employ a 32-bit data path with 4 parity bits, one for each 8-bit byte of data. Additional SIMMs are required to populate the additional SIMM sockets necessary to support the wider data paths of such systems.

Newer SIMMs can support wider data paths; for example a 36-bit SIMM on a single module board is now available commercially. Such a board could be modified to accept the present invention by replacing 4 bits of DRAM with 4 Self-Parity Generators or their equivalent.

The preferred embodiment has been described which includes an even parity generator tree. A simple modification would be to use an odd parity generator tree.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A memory module for installation on a printed circuit mother board, the printed circuit mother board providing an external parity checker, the memory module comprising:
   data memory chips for storing digital data in a plurality of locations within the data memory chips, having data inputs and outputs, control inputs and address inputs;
   a parity generator, responsive to the data outputs, for calculating parity of the digital data;
   a substrate, the substrate being an epoxy-glass printed circuit board substrate, having a length and width adequate for mounting thereon the data memory chips and the parity generator, and for interconnecting the control inputs and address inputs, and for interconnecting the data outputs from the data memory chips to the parity generator;
   terminals on the substrate for providing access to the data inputs and outputs, control inputs and address inputs to enable reading and writing of digital data into and out of the data memory chips;
   a parity output terminal on the substrate for outputting the parity calculated by the parity generator, for transmission to the external parity checker;
   a parity input terminal on the substrate, interconnected to the parity generator, for inputting externally generated parity during writing to locations in the data memory chips;
   parity type determining means, coupled to the parity input terminal and the parity generator, for determining a type of parity required by the external parity checker;
   storage means, coupled to parity determining means, to store the type of parity required by the external parity checker; and
   inverting means, responsive to the storage means, for inverting the parity calculated by the parity generator;
   whereby even or odd parity information will be outputted by the memory module depending upon the type of parity required by the external parity checker.

2. The memory module of claim 1 further comprising:
   support means for supporting the memory module at an angle with respect to the printed circuit mother board when the memory module is installed thereon.

3. The memory module of claim 1 further comprising:
   decoupling capacitors, mounted on the memory module and connected between the memory chips, for suppressing transient voltage spikes on the memory module.

4. The memory module of claim 1 wherein the storage means is coupled to the control inputs of the data memory chips.

5. The memory module of claim 4 wherein the storage means stores the type of parity determined by the parity type determining means when the control inputs indicate a writing operation to the data memory chips.

6. The memory module of claim 5 further comprising output means, coupled to the inverting means, for outputting generated parity when the control inputs indicate a read operation from the data memory chips.

7. The memory module of claim 1 wherein the parity type determining means comprises an exclusive OR gate.

8. The memory module of claim 1 wherein the inverting means includes an exclusive-OR gate.

9. A device for selecting and outputting parity of a proper type in a system with an external parity generator and checker, the device comprising:
  a plurality of data inputs from the system;
  a parity generator tree, responsive to the plurality of data inputs, generating a parity tree output, the parity tree output indicating that an even number of data inputs are in a first logic state;
  an external parity input, providing parity information from the external parity generator corresponding to data on the plurality of data inputs;
  parity type determining means, coupled to the parity tree output and the external parity input, indicating if the parity generator tree and the external parity generator are generating parity of a same type for the data on the plurality of data inputs;
  storage means, coupled to the parity type determining means, for storing the type of parity needed by the system;
  inverting means, responsive to the storage means, for inverting the type of parity generated by the parity generator tree if the parity type determining means indicated that the parity generator tree and the external parity generator were generating parity of different types; and
  output means, coupled to the inverting means, for outputting generated parity when a read operation is occurring,
  whereby a correct type of parity needed by the external parity checker is outputted.

10. A device for selecting and outputting parity of a type in a system with an external parity generator and checker, the device comprising:
  a plurality of data inputs from the system;
  a parity generator tree, responsive to the plurality of data inputs, generating a parity tree output, the parity tree output indicating that an even number of data inputs are in a first logic state;
  an external parity input, providing parity information from the external parity generator corresponding to data on the plurality of data inputs;
  parity type determining means, coupled to the parity tree output and the external parity input, indicating if the parity generator tree and the external parity generator are generating parity of a same type for the data of the plurality of data inputs;
  storage means, coupled to the parity type determining means, for storing the type of parity needed by the system;
  inverting means, responsive to the storage means, for inverting the type of parity generated by the parity generator tree if the parity type determining means indicated that the parity generator tree and the external parity generator were generating parity of different types;
  the parity type determining means comprising an exclusive-OR gate to indicate a mis-match between the parity tree output and the external parity input;
  whereby a correct type of parity needed by the external parity checker is outputted.

11. The device of claim 10 wherein the storage means stores a mismatch indication from the parity type determining means when a write operation is occurring.

12. The device of claim 10 wherein the inverting means includes an exclusive-OR gate.

13. A memory module for installation on a primed circuit mother board, the printed circuit mother board providing an external parity checker, the memory module comprising:
  data memory chips for storing digital data in a plurality of locations within the data memory chips, having data inputs and outputs, control inputs and address inputs;
  a parity generator, responsive to the data outputs, for calculating parity of the digital data;
  a substrate, the substrate being an epoxy-glass printed circuit board substrate, having a length and width adequate for mounting thereon the data memory chips and the parity generator, and for interconnecting the control inputs and address inputs, and for interconnecting the data outputs from the data memory chips to the parity generator;
  terminals on the substrate for providing access to the data inputs and outputs, control inputs and address inputs to enable reading and writing of digital data into and out of the data memory chips;
  a parity output terminal on the substrate for outputting the parity calculated by the parity generator, for transmission to the external parity checker;
  support means for supporting the memory module at an angle with respect to the primed circuit mother board when the memory module is installed thereon;
  decoupling capacitors, mounted on the memory module and connected between the data memory chips, for suppressing transient voltage spikes on the memory module;
  a parity input terminal on the substrate, interconnected to the parity generator, for inputting externally generated parity during writing to locations in the data memory chips;
  parity type determining means, coupled to the parity input terminal and the parity generator, for determining a type of parity required by the external parity checker;
  storage means, coupled to the parity type determining means, to store the type of parity required by the external parity checker; and
  inverting means responsive to the storage means, for inverting the parity calculated by the parity generator;
  whereby the parity of the dam outputs is generated by the parity generator on the substrate, eliminating a need to store parity information associated with each location in the data memory chips and whereby even or odd parity information will be outputted by the memory module depending upon the type of parity required by the external parity checker.

14. The memory module of claim 13 wherein the storage means is coupled to the control inputs of the data memory chips, file storage means storing the type of parity determined by the parity type determining means when the control inputs indicate a writing operation to the data memory chips.

15. The memory module of claim 14 wherein the parity type determining means comprises an exclusive OR gate.

16. The memory module of claim 15 wherein the inverting means includes an exclusive-OR gate.

17. The memory module of claim 16 further comprising output means, coupled to the inverting means, for outputting generated parity when the control inputs indicate a read operation from the data memory chips.

* * * * *